Aug. 18, 1936.        W. C. HEDGCOCK        2,051,598
TRUCK
Filed Oct. 7, 1932        4 Sheets-Sheet 3
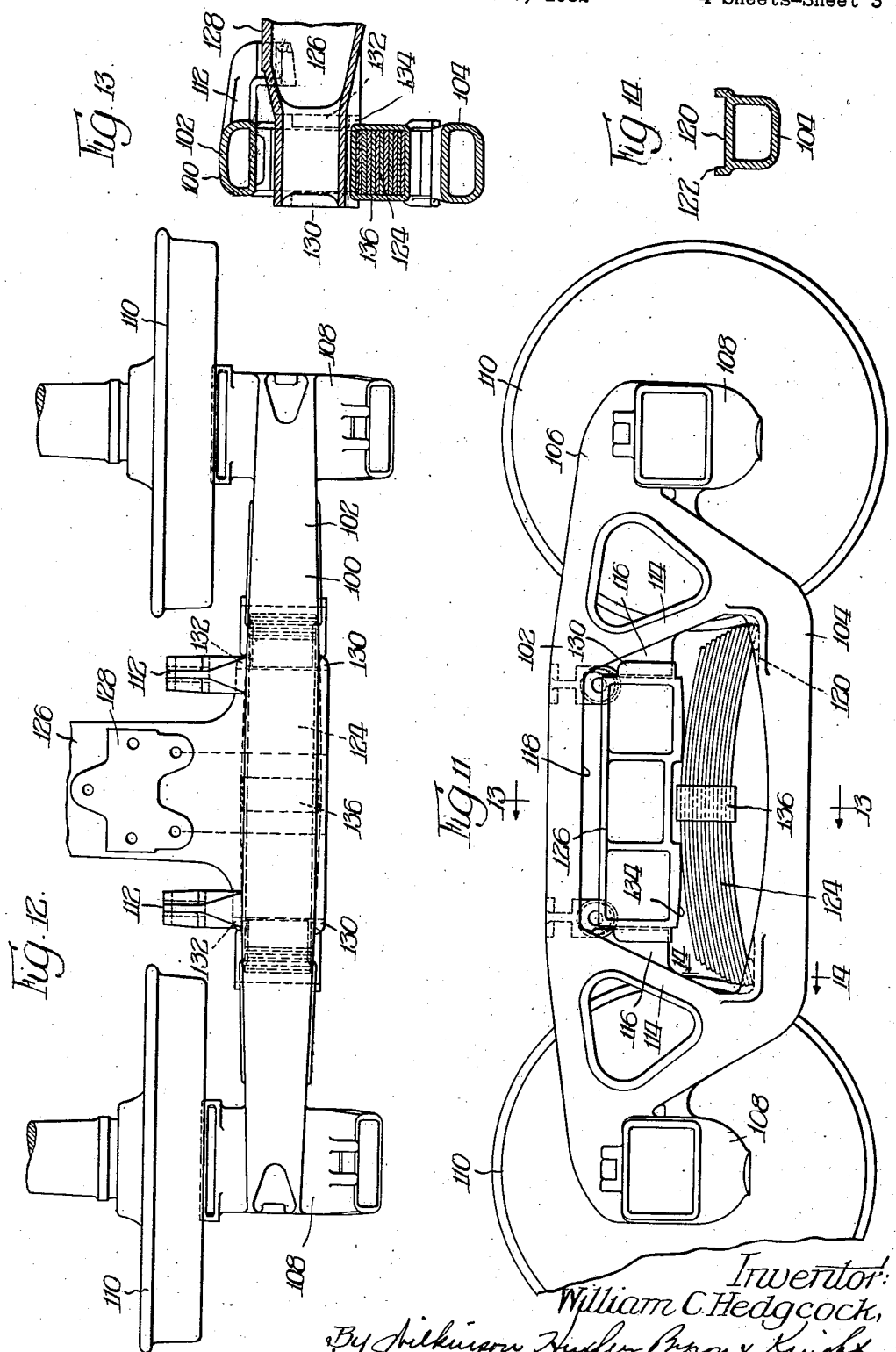

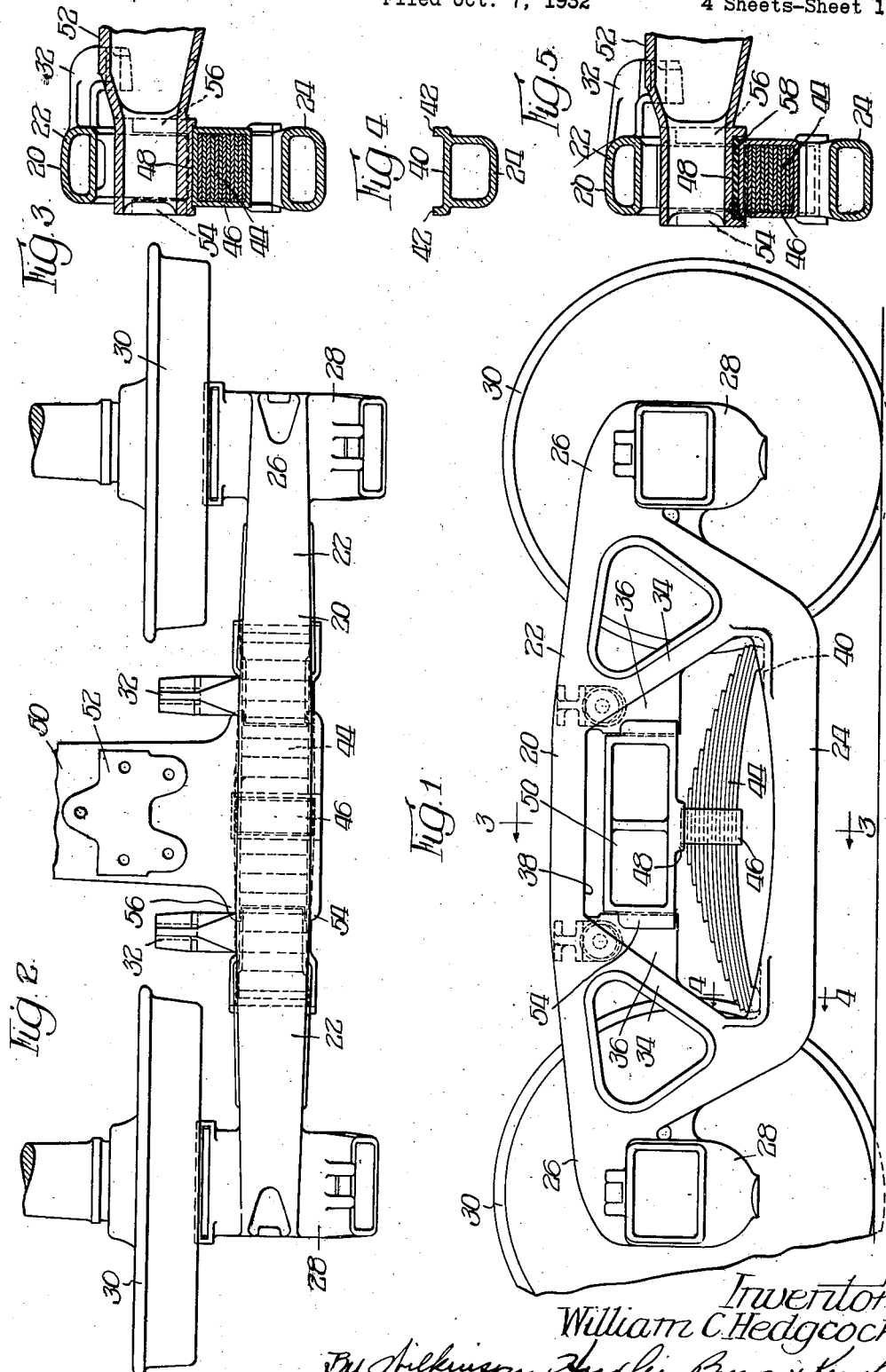

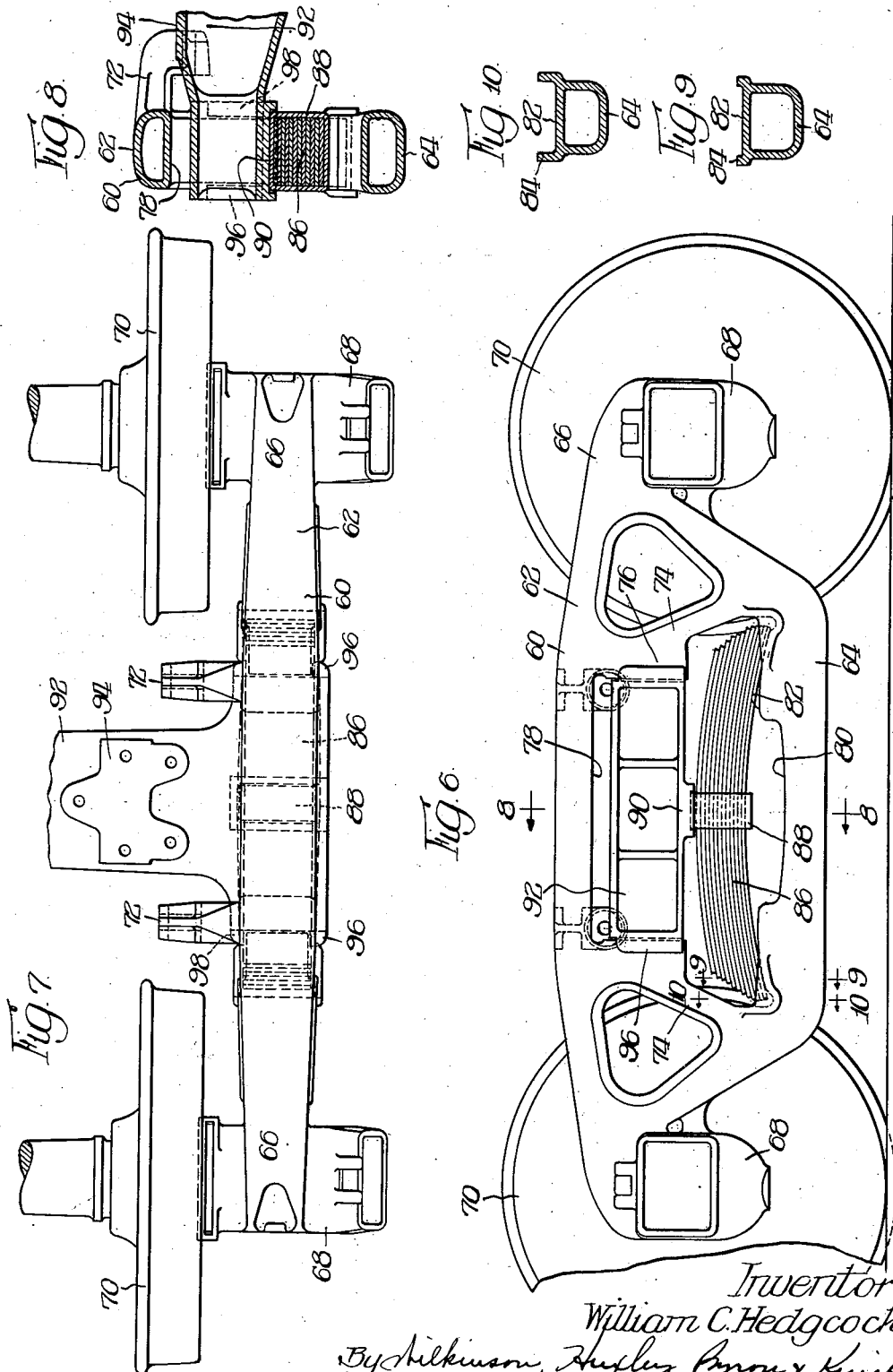

Aug. 18, 1936.  W. C. HEDGCOCK  2,051,598
TRUCK
Filed Oct. 7, 1932    4 Sheets-Sheet 4
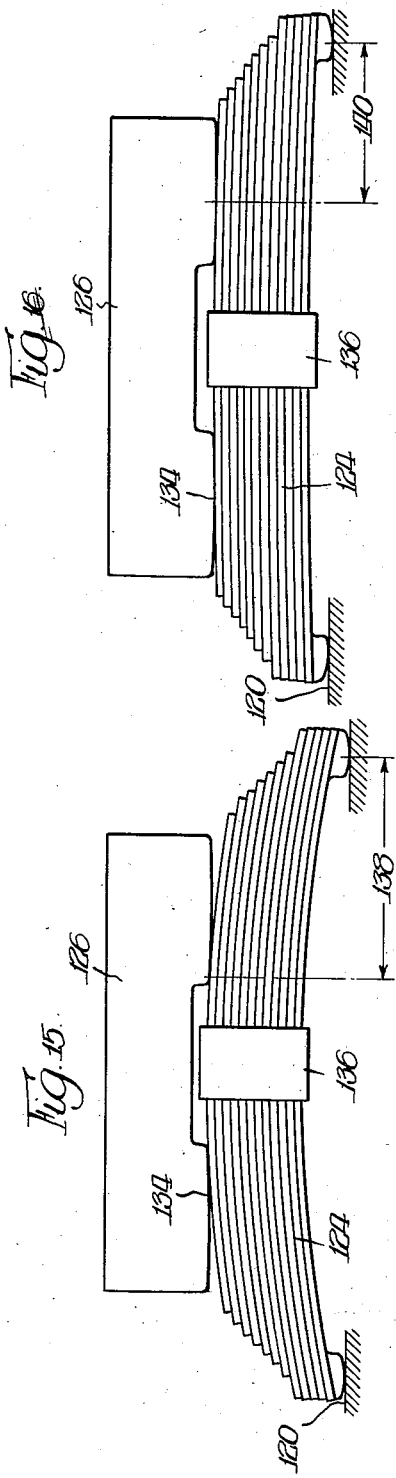
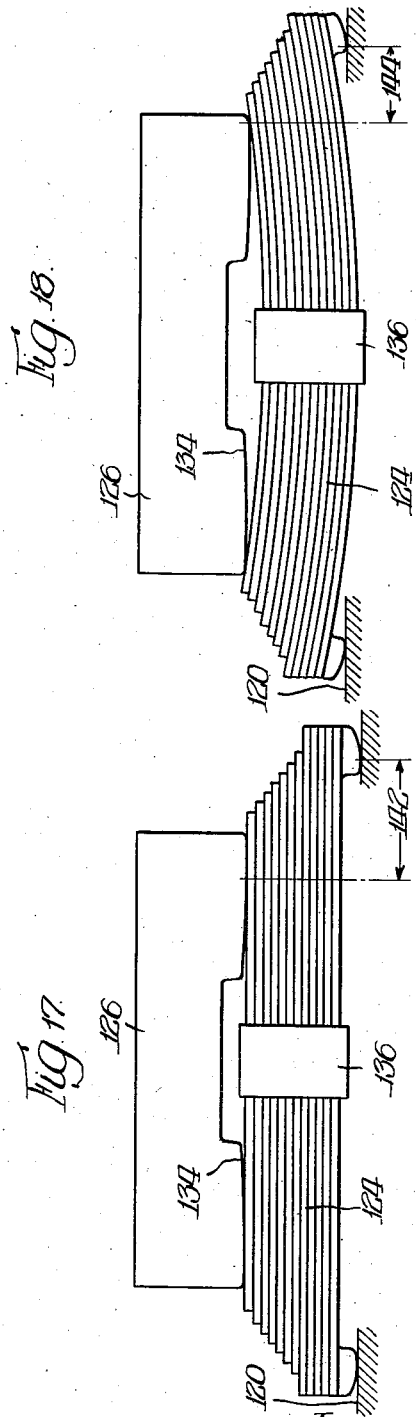
Inventor:
William C. Hedgcock, Patented Aug. 18, 1936

2,051,598

UNITED STATES PATENT OFFICE 2,051,598

TRUCK

William C. Hedgcock, Wilmette, Ill., assignor to American Steel Foundries, Chicago, Ill., a corporation of New Jersey Application October 7, 1932, Serial No. 636,651

25 Claims. (Cl. 105—197)

This invention pertains to truck construction.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

Another further object is to provide a truck construction wherein the load carrying member is carried on the side frame by means which varies its effective load transmitting length according to the imposed load.

Yet another object of the invention is to provide a truck construction wherein the stiffness of the springs varies in accordance with load or deflection.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary side elevation of a truck construction embodying the invention;

Figure 2 is a fragmentary top plan view of the truck construction shown in Figure 1;

Figure 3 is a transverse fragmentary sectional elevation taken substantially in the plane as indicated by the line 3—3 of Figure 1;

Figure 4 is a transverse sectional elevation taken substantially in the plane as indicated by the line 4—4 of Figure 1;

Figure 5 is a fragmentary transverse sectional elevation corresponding to that shown in Figure 3 showing the use of a sound deadening resilient pad;

Figure 6 is a fragmentary side elevation of a modified form of truck construction embodying the invention;

Figure 7 is a fragmentary top plan view of the truck construction shown in Figure 6;

Figure 8 is a fragmentary transverse sectional elevation taken substantially in the plane as indicated by the line 8—8 of Figure 6;

Figures 9 and 10 are transverse sectional elevations taken substantially in the planes as indicated by the lines 9—9 and 10—10, respectively, of Figure 6;

Figure 11 is a fragmentary side elevation of yet another modified form of truck construction;

Figure 12 is a top plan view of the truck construction shown in Figure 11;

Figure 13 is a fragmentary transverse sectional elevation taken substantially in the plane as indicated by the line 13—13 of Figure 11;

Figure 14 is a transverse fragmentary sectional elevation taken substantially in the plane as indicated by the line 14—14 of Figure 11;

Figures 15 to 18 inclusive, show the arrangement of the spring and load carrying member shown in Figures 11 to 14 inclusive, indicating the general method of operation thereof wherein Figure 15 shows the position of the end of the bolster on the spring when it is free from load, that is, is normal position;

Figure 16 shows the same spring under a thirty per cent load;

Figure 17 shows the same spring under a fifty per cent load;

Figure 18 shows the deflected spring under full load.

Referring first of all more particularly to the truck construction illustrated in Figures 1 to 5 inclusive, the side frame 20 is substantially of truss construction, including the compression member 22 and the tension member 24 merging adjacent the ends thereof as at 26, being provided with the journal boxes 28 cooperating with the journal ends of the wheel and axle assemblies 30, the side frame having the brake hanger brackets 32 extending inwardly adjacent said wheel and axle assemblies. The tension and compression members are integrally connected by means of the columns 34 which extend between the tension and compression members and converge upwardly throughout their entire length, the same being provided with the column guide portions 36 extending towards each other, the columns forming the window 38 with substantially horizontal portions of the tension and compression members.

The tension member between and adjacent the columns 34 is provided with the leaf spring seats 40 defined by the side flanges 42 merging into the columns, said leaf spring seats 40 serving to support the ends of the semi-elliptic leaf spring assembly 44. It is to be noted that in this embodiment the seats 40 are spaced apart a distance substantially greater than the space between said column guide portions. The leaf spring assembly 44 is provided with the spring band 46 disposed adjacent the center thereof, the spring band being received in a suitable seat 48 provided on the load carrying member which, in the form shown, is the bolster 50. The bolster is of the usual construction, being provided with the center bearing (not shown) and the side bearings 52, the ends of the bolster being provided with portions defined by the spaced flanges 54 and 56 having sliding cooperation with the column guides 36.

The construction shown in Figure 5 is similar to that already described, and shows resilient pads 58 interposed between the bolster 50 and spring band 46 for the purpose of deadening sound, it being understood that such pads may be interposed between other adjacent metallic surfaces for this purpose.

Referring now more particularly to the embodiment illustrated in Figures 6 to 10 inclusive, the side frame 60 is also substantially of truss construction, including the compression member 62 and the tension member 64 merging adjacent their ends as at 66 and being provided with the journal boxes 68 having cooperative relation with the journal ends of the wheel and axle assemblies 70. The side frame is provided with the brake hanger brackets 72 extending inwardly and adjacent the wheel and axis assemblies.

The tension and compression members are integrally connected by means of the upwardly converging columns 74 provided with the column guide portions 76, the columns forming the window 78 with substantially horizontal portions of the tension and compression members. The tension member between the column guides is interrupted as at 80 and is provided adjacent said columns with the leaf spring seats 82, said spring seats being of downwardly arcing disposition or sloping downwardly adjacent the columns and being provided with the side flanges 84. The disposition of the seats 82 is shown particularly in Figure 6 and by the contrast between the sections illustrated in Figures 9 and 10. The leaf spring seats 82 are adapted to receive and support the ends of the semi-elliptic leaf spring assembly 86, said spring assembly being provided adjacent the center thereof with the spring band 88. The spring band is disposed in a suitable seat 90 provided on the end of the load carrying member which, in the form shown, is the bolster 92. As illustrated, the seats 82 are not as far apart with respect to the column guides 76 as in Figure 1 of the drawings, but are shown as being disposed substantially beneath the column guides 76.

The bolster is of usual construction, being provided with the center bearing (not shown) and the side bearings 94, the ends of the bolster being provided with portions defined by the spaced lugs 96 and 98 and having sliding cooperation with the column guides 76. The end of the bolster, therefore, is supported in the window by means of the longitudinally arranged leaf spring in such a manner that the stiffness of the spring increases as it deflects or varies in accordance with the load placed upon it in a way to be more particularly shown and described.

Referring now more particularly to the construction illustrated in Figures 11 to 18 inclusive, the side frame 100 is also of substantially truss construction including the compression member 102 and the tension member 104, merging adjacent the ends thereof as at 106 and being provided with the journal boxes 108 having cooperative relation with journal ends of the wheel and axle assemblies 110, the side frame having the brake hanger brackets 112 extending inwardly adjacent the wheel and axle assemblies. The tension and compression members are integrally connected by means of the upwardly converging columns 114 provided with the column guide portions 116. The columns form the window 118 with substantially horizontal portions of the tension and compression members.

The tension member, between and adjacent the columns 114 is provided with the leaf spring seats 120 defined by the side flanges 122, said leaf spring seats serving to support the ends of the semi-elliptic leaf spring assembly 124. The disposition of the seats 120 in this embodiment with respect to the column guides 116 more closely approaches the construction shown in Figure 6 and is substantially beneath the column guides 116. The load carrying member, which in the construction illustrated is the bolster 126, is of usual construction, being provided with the center bearing (not shown) and the side bearings 128, the end of the bolster extending into the window and having portions, defined by the spaced flanges 130 and 132 disposed in sliding cooperation with the column guides 116. The bolster is provided with spaced spring seats 134 supporting the bolster on each side of the spring band 136. The seats 134 are arced upwardly, or slope upwardly, from the longitudinal center line of the bolster so that when the truck is in operation and the leaf spring deflects, the effect will be to vary the stiffness in accordance with the deflection or in accordance with the load placed upon the load carrying member. A similar effect is obtained in the construction illustrated in Figures 7, 8 and 9.

The operation of the spring is readily understood by a reference to Figures 15 to 18 inclusive. In the construction shown in Figure 15 wherein the load carrying member 126 is supported under a condition of no load, the effective spring length or deflection length is that defined as at 138. Under the condition of thirty per cent load, as illustrated in Figure 16; fifty per cent load as shown in Figure 17; and full load as shown in Figure 18, the effective length is progressively diminished as illustrated at 140, 142, and 144, so that the stiffness increases and therefore the resistance to vertical movements of the bolster increases, and, as a greater portion of the friction absorption of the springs is adjacent the end of the leaves, this has the effect of increasing the effective frictional absorption of the semi-elliptic leaf spring.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a car truck, the combination of a side frame including tension and compression members and spaced integral columns extending therebetween and forming a window therewith, said columns converging throughout their length and having column guides extending toward each other, a load carrying member extending into said window and having sliding cooperation with said column guides, and a semi-elliptic spring providing the sole support for said load-carrying member and disposed wholly in said window, said spring being supported on seats provided on said side frame adjacent the junction of said columns with said tension member.

2. In a car truck, the combination of a side frame including tension and compression members and spaced integral columns extending therebetween and forming a window therewith, said columns converging throughout their length and having column guides extending toward each other, a load carrying member extending into said window and having sliding cooperation with said column guides, and a semi-elliptic spring providing the sole support for said load carrying member at a single point and supported and disposed wholly in said window at a plurality of points, said points being provided on said side frame adjacent the junction of said columns with said tension member.

3. In a car truck, the combination of a side frame including tension and compression members and spaced integral columns extending therebetween and forming a window therewith, columns converging throughout their length and having column guides extending toward each other, a load carrying member extending into said window and having sliding cooperation with said column guides, and a semi-elliptic spring supporting said load carrying member at a plurality of points and supported in said window at a plurality of points provided on said side frame, said points being adjacent the junction of said columns with said tension member.

4. In a car truck, the combination of a side frame including tension and compression members merging adjacent the ends thereof and providing with journal boxes, spaced integral columns forming a window with said tension and compression members being provided with column guides extending toward each other, said columns converging throughout their length and being spaced apart a greater distance adjacent said tension member than said compression member, a load carrying member extending into said window and having sliding cooperation with said column guides, and a semi-elliptic spring supporting said load carrying member at a plurality of points and supported in said window at a plurality of points provided on said side frame, said points being substantially beneath said column guides.

5. In a car truck, the combination of a side frame including tension and compression members merging adjacent the ends thereof and provided with journal boxes, spaced integral columns forming a window with said tension and compression members being provided with column guides extending toward each other, said columns converging throughout their length and being spaced apart a greater distance adjacent said tension member than said compression member, a load carrying member extending into said window and having sliding cooperation with said column guides, and a semi-elliptic spring providing the sole support of said load carrying member in said window, said spring being supported on seats on said side frame adjacent the junction of said columns with said tension member.

6. In a car truck, the combination of a side frame including tension and compression members and spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member in said window, said load carrying member being resiliently mounted on said spring, said spring being supported on seats provided on said side frame and disposed substantially beneath said column guides.

7. In a car truck, the combination of a side frame including tension and compression members and spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member in said window, said load carrying member being resiliently mounted on said spring by a resilient pad, said spring being supported on seats provided on said side frame and disposed adjacent the junction of said columns with said tension member.

8. In a car truck, the combination of a side frame including tension and compression members merging adjacent the ends thereof and provided with journal boxes, spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member on spaced seats in said window provided on the tension member of said side frame, said seats being arranged to decrease the effective spring length upon deflection thereof.

9. In a car truck, the combination of a side frame including tension and compression members merging adjacent the ends thereof and provided with journal boxes, spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member on spaced arcuate seats in said window provided on the tension member of said side frame, the effective length of said spring being adapted to vary upon deflection thereof.

10. In a car truck, the combination of a side frame including tension and compression members merging adjacent the ends thereof and provided with journal boxes, spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member on spaced seats in said window provided on said side frame, said seats sloping toward said columns to decrease the effective spring length upon deflection thereof.

11. In a car truck, the combination of a side frame including tension and compression members merging adjacent the ends thereof and provided with journal boxes, spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member on spaced seats in said window provided on the tension member of said side frame, said seats being arranged to vary the effective spring length upon deflection thereof.

12. In a car truck, the combination of a side frame including tension and compression members merging adjacent the ends thereof and provided with journal boxes, spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member on spaced seats in said window provided on said side frame, said seats sloping toward said columns to vary the effective spring length upon deflection thereof.

13. In a car truck, the combination of a side frame including tension and compression members merging adjacent the ends thereof and provided with journal boxes, spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member on spaced seats in said window provided on said side frame, said spring engaging said load carrying member in load transferring relation at a plurality of seats provided on said load carrying member, said seats being arranged to decrease the effective spring length upon deflection thereof.

14. In a car truck, the combination of a side frame including tension and compression members merging adjacent the ends thereof and provided with journal boxes, spaced integral columns extending therebetween and forming a window therewith, said columns converging throughout their length and having column guides extending toward each other, a load carrying member extending into said window and having sliding cooperation with said column guides, and a semi-elliptic spring supporting said load carrying member on spaced seats in said window provided on said side frame, said spring engaging said load carrying member in load transferring relation at a plurality of seats provided on said load carrying member, said seats being arranged to vary the effective spring length upon deflection thereof.

15. In a car truck, the combination of a side frame including tension and compression members merging adjacent the ends thereof and provided with journal boxes, spaced integral column guides forming a window with said tension and compression members, a load carrying member extending into said window and having sliding cooperation with said column guides, and a semi-elliptic spring supporting said load carrying member on spaced seats in said window, said spring engaging said load carrying member at a plurality of arcuate seats provided on said load carrying member, said arcuate seats being arranged to decrease the effective spring length upon deflection thereof.

16. In a car truck, the combination of a side frame including tension and compression members merging adjacent the ends thereof and provided with journal boxes, spaced integral column guides forming a window with said tension and compression members, a load carrying member extending into said window and having sliding cooperation with said column guides, and a semi-elliptic spring supporting said load carrying member on spaced seats in said window, said spring engaging said load carrying member at a plurality of arcuate seats provided on said load carrying member, said arcuate seats being arranged to vary the effective spring length upon deflection thereof.

17. In a side frame, the combination of tension and compression members merging adjacent the ends thereof and being provided with journal boxes, columns integrally connecting said tension and compression members and converging throughout their length, said columns having column guide portions extending toward each other, and leaf spring seats disposed on said tension member adjacent and between said columns and spaced apart a distance substantially greater than the space between said column guide portions.

18. In a side frame, the combination of tension and compression members merging adjacent the ends thereof and being provided with journal boxes, columns integrally connecting said tension and compression members and converging throughout their length, said columns having column guide portions extending toward each other, and leaf spring seats disposed on said tension member adjacent and between said columns.

19. In a side frame, the combination of tension and compression members merging adjacent the ends thereof and being provided with journal boxes, columns integrally connecting said tension and compression members and converging throughout their length, said columns having column guide portions extending toward each other, and arcuate leaf spring seats disposed on said tension member adjacent and between said columns.

20. In a side frame, the combination of tension and compression members merging adjacent the ends thereof and being provided with journal boxes, columns integrally connecting said tension and compression members and converging throughout their length, said columns having column guide portions extending toward each other, and arcuate leaf spring seats disposed on said tension member adjacent and between said columns, said seats being disposed substantially beneath said column guides.

21. In a side frame, the combination of tension and compression members merging adjacent the ends thereof and being provided with journal boxes, columns integrally connecting said tension and compression members and converging throughout their length, said columns having column guide portions extending toward each other, and downwardly arcuate leaf spring seats disposed on said tension member adjacent and between said columns.

22. In a side frame, the combination of tension and compression members merging adjacent the ends thereof and being provided with journal boxes, columns integrally connecting said tension and compression members and converging throughout their length, said columns having column guide portions extending toward each other, and downwardly arcuate leaf spring seats disposed on said tension member adjacent and between said columns, said seats being disposed substantially beneath said column guides.

23. In a car truck, the combination of a side frame having spaced journal boxes, spaced spring seats between said journal boxes, a leaf spring supported on said seats, a load carrying member supported on said spring, said load carrying member having spaced arcuate seats engaging said spring to decrease the effective spring length upon deflection thereof.

24. In a car truck, the combination of a side frame having spaced journal boxes, spaced spring seats between said journal boxes, a leaf spring supported on said seats, a load carrying member supported on said spring, said load carrying member having spaced arcuate seats engaging said spring to vary the effective spring length upon deflection thereof.

25. In a car truck, the combination of a side frame including tension and compression members and spaced integral columns forming a window therewith, said columns converging throughout their length and having column guides extending toward each other, a bolster extending into said window and having sliding cooperation with said column guides, and a semi-elliptic spring disposed in the plane of said side frame and providing the sole support for said bolster thereon, said spring being disposed within said window and supported on said side frame at spaced points adjacent the junction of said columns with said tension member.

WILLIAM C. HEDGCOCK.